(12) United States Patent
Kawasaki et al.

(10) Patent No.: US 7,336,958 B2
(45) Date of Patent: Feb. 26, 2008

(54) DATA TRANSMISSION PATH ESTABLISHING METHOD, RADIO COMMUNICATION NETWORK SYSTEM, AND SENSOR NETWORK SYSTEM

(75) Inventors: Daisuke Kawasaki, Tokyo (JP); Takehiro Hokimoto, Tokyo (JP); Arata Toyoda, Tokyo (JP); Kazuhiko Isoyama, Tokyo (JP); Takahiro Ohkuma, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 10/941,951

(22) Filed: Sep. 16, 2004

(65) Prior Publication Data

US 2005/0064871 A1   Mar. 24, 2005

(30) Foreign Application Priority Data

Sep. 19, 2003   (JP) ............................. 2003-327069

(51) Int. Cl.
*H04Q 7/20* (2006.01)
(52) U.S. Cl. .................. 455/450; 455/422.1; 455/463; 455/464; 455/517; 455/518; 455/520; 709/237; 709/223; 709/204
(58) Field of Classification Search ................ 455/450, 455/422.1, 463, 464, 522, 517, 518, 519, 455/520; 709/237, 223, 204
See application file for complete search history.

(56) References Cited

U.S. PATENT DOCUMENTS

2003/0104829 A1* 6/2003 Alzoubi et al. ............. 455/517
2003/0144003 A1* 7/2003 Ranta et al. ................ 455/450
2004/0003111 A1* 1/2004 Maeda et al. ............... 709/237
2005/0222948 A1* 10/2005 Sato et al. .................... 705/40

FOREIGN PATENT DOCUMENTS

| JP | 9-331284 | 12/1997 |
| JP | 2001-237764 | 8/2001 |
| WO | WO 02/087172 | 10/2002 |

* cited by examiner

*Primary Examiner*—Rafael Perez-Gutierrez
*Assistant Examiner*—Khai Nguyen
(74) *Attorney, Agent, or Firm*—Young & Thompson

(57) ABSTRACT

A data transmission path establishing method for establishing a data transmission path from each device to a base station independently to thereby form a network with small devices which are required to consume lower amounts of power such as sensors, a radio communication network system and a sensor network system. A base station transmits detection signals to a plurality of radio devices. Each of the radio devices which have received the detection signal transmits detection response signals each including an identifier that uniquely identifies the device and doubling as a response signal and a detection signal for another radio device. Having received the detection response signal from a radio device, the base station recognizes the radio device as a radio device belonging to the station based on the identifier included in the detection response signal. In the case where a downstream radio device receives a detection response signal from an upstream radio device, the downstream radio device belongs to the upstream radio device. Also the downstream radio device transmits a detection response signal to the upstream radio device. When receiving the detection response signal from the downstream radio device, the upstream radio device transmits a link information signal indicating the identifier of the downstream radio device to the base station.

16 Claims, 5 Drawing Sheets

FIG.4

| ROUTING TABLE OF BASE STATION 0 | |
|---|---|
| UPSTREAM TERMINAL ID | — |
| DOWNSTREAM TERMINAL ID | 1, 2 |

| ROUTING TABLE OF SENSOR TERMINAL 1 | |
|---|---|
| UPSTREAM TERMINAL ID | 0 |
| DOWNSTREAM TERMINAL ID | 3 |

| ROUTING TABLE OF SENSOR TERMINAL 2 | |
|---|---|
| UPSTREAM TERMINAL ID | 0 |
| DOWNSTREAM TERMINAL ID | 4 |

| ROUTING TABLE OF SENSOR TERMINAL 3 | |
|---|---|
| UPSTREAM TERMINAL ID | 1 |
| DOWNSTREAM TERMINAL ID | — |

| ROUTING TABLE OF SENSOR TERMINAL 4 | |
|---|---|
| UPSTREAM TERMINAL ID | 2 |
| DOWNSTREAM TERMINAL ID | — |

DATA TRANSMISSION PATH ESTABLISHING METHOD, RADIO COMMUNICATION NETWORK SYSTEM, AND SENSOR NETWORK SYSTEM

FIELD OF THE INVENTION

The present invention relates to a method for establishing data transmission paths in a communication system including a plurality of radio communication terminals, a radio communication network system and a sensor network system, and in more particular, to a method for establishing data transmission paths enabling stable radio communication with less traffic, a radio communication network system and a sensor network system.

BACKGROUND OF THE INVENTION

In an age of ubiquitous networks, it is conceivable that sensors, each having radio communication functions, will communicate with each other by radio and establish a sensor network. Such sensor network will be required to provide a user at a remote site with access to sensing data collected automatically from the respective sensors.

However, in ordinary conventional radio communication systems, it has not been expected that a radio communication network is to be formed with small devices such as sensors, and a large amount of data have to be processed at the time of radio communication. Consequently, it is difficult to form a radio communication network with sensors.

Additionally, it is often the case that a small electronic device as a sensor is used in a place where a power supply line cannot be secured. In such a case, the small electronic device works on a solar battery, an accumulator (storage battery) or the like as a necessity. Therefore, the small electronic device is required to operate while consuming lower amounts of power.

Conventional radio communication systems in general were not developed in consideration of low electric power consumption. In this respect, the conventional systems are not suited to form a radio communication network with small electronic devices such as sensors.

As conventional radio communication systems which may have applicability to creating a radio communication network with small electronic devices such as sensors, there have been only such systems as follows:

(1) systems, in which respective sensor terminals simultaneously exchange path information at regular time intervals, as described in Japanese Patent Application laid open No. 2001-237764, "Multi-hop Radio Network and Radio Station"; and (2) systems, in which not all sensor terminals establish a data transmission path but part of backbone terminals automatically set the path, and fixed radio communication is held between respective backbone terminals and sensor terminals.

According to the aforementioned "Multi-hop Radio Network and Radio Station", each radio station obtains information on the number of hops from an accessible radio station. When direct access to a base station is available, the base station is selected as a connection destination radio station. In other cases, one accessible radio station whose number of hops can be made the minimum is selected as a high order connection destination radio station. Then, a signal received from a slave radio station is transferred to the high order radio station.

In the system (1) as described above, however, the frequency of transmission including unnecessary one increase, and therefore, it is difficult to reduce electric power consumption. For that reason, the system (1) is not suited to small devices such as sensors.

Besides, in the system (2) as described above, it is impossible to meet a requirement that data transmission paths are automatically set in such a manner as to collect data at one place (a base station) regardless of the placement of all devices.

There has been disclosed another conventional technique for forming a radio communication network with small electronic devices such as sensors in Japanese Patent Application laid open No. HEI9-331284, "Radio Relay System".

According to the "Radio Relay System", a message is relayed to its destination via electronic devices located between sending and receiving electronic devices to reduce the power required for transmission. This means that an electronic device that sends a message needs prior knowledge as to which electronic devices are present between it and an electronic device as the destination of the message. There is no problem when each of electronic devices is fixed in a position. However, if the electronic devices change their positions, that is, if the network structure is variable and data transmission paths to a base station have to be established independently, the radio relay system cannot be employed.

As described above, in the conventional radio communication system, there has not been proposed a data transmission path establishing method for establishing a data transmission path from each device to a base station independently, thereby forming a network with small devices which are required to consume lower amounts of power, such as sensors.

SUMMARY OF THE INVENTION

It is therefore an object of the present invention to provide a data transmission path establishing method for establishing a data transmission path from each device to a base station independently to thereby create a network with small devices which are required to consume lower amounts of power such as sensors, a radio communication network system and a sensor network system.

In accordance with the first aspect of the present invention, to achieve the object mentioned above, there is provided a data transmission path establishing method, wherein: a base station transmits detection signals to a plurality of radio devices; each of the radio devices which have received the detection signal transmits detection response signals each including an identifier that uniquely identifies the device and doubling as a response signal and a detection signal for another radio device; the base station which have received the detection response signal from a radio device recognizes the radio device as a radio device belonging to the station based on the identifier included in the detection response signal; a radio device which have received the detection response signal from another radio device belongs to the radio device that is the source of the detection response signal when the device does not belong to the base station or any other radio device, while when the radio device belongs to the base station or another radio device, the device transmits a link information signal indicating the identifier of the radio device that is the source of the detection response signal to the base station or the radio device to which the device belongs; and the radio device which have received the link information signal forwards the link information signal to the base station or a radio device to which the device belongs.

In accordance with the first aspect of the present invention, the radio devices which have received the detection signal may transmit the detection response signals only when the reception strength or intensity of the detection signal is equal to or more than a prescribed threshold.

Further, in accordance with the first aspect of the present invention, the radio device which does not belong to the base station or any other radio device may belong to the radio device that is the source of the detection response signal only when the reception strength or intensity of the detection response signal is equal to or more than a prescribed threshold.

In accordance with the second aspect of the present invention, there is provided a data transmission path establishing method, wherein: a base station transmits detection signals to a plurality of sensor terminals each having a sensor that outputs sensing data; each of the sensor terminals which have received the detection signal transmits detection response signals each including an identifier that uniquely identifies the terminal and doubling as a response signal and a detection signal for another sensor terminal; the base station which have received the detection response signal from a sensor terminal recognizes the sensor terminal as a sensor terminal belonging to the station based on the identifier included in the detection response signal; a sensor terminal which have received the detection response signal from another sensor terminal belongs to the sensor terminal that is the source of the detection response signal when the terminal does not belong to the base station or any other sensor terminal, while when the sensor terminal belongs to the base station or another sensor terminal, the terminal transmits a link information signal indicating the identifier of the sensor terminal that is the source of the detection response signal to the base station or the sensor terminal to which the terminal belongs; and the sensor terminal which have received the link information signal forwards the link information signal to the base station or a sensor terminal to which the terminal belongs.

In accordance with the second aspect of the present invention, the sensor terminals which have received the detection signal may transmit the detection response signals only when the reception strength or intensity of the detection signal is equal to or more than a prescribed threshold.

Further, in accordance with the second aspect of the present invention, the sensor terminal which does not belong to the base station or any other sensor terminal may belong to the sensor terminal that is the source of the detection response signal only when the reception strength or intensity of the detection response signal is equal to or more than a prescribed threshold.

In accordance with the third aspect of the present invention, there is provided a radio communication network system comprising a base station and a plurality of radio devices, wherein the base station includes: a section for transmitting detection signals to at least part of the radio devices; and a section for, when receiving a detection response signal from a radio device, recognizing the radio device as a radio device belonging to the station based on the identifier of the radio device included in the detection response signal; and wherein each of the radio devices includes: a section for transmitting detection response signals each including an identifier that uniquely identifies the device and doubling as a response signal and a detection signal for another radio device in response to the detection signal received from the base station; a section for, when the radio device receives the detection response signal from another radio device, belonging to the radio device that is the source of the detection response signal in the case where the device does not belong to the base station or any other radio device, while in the case where the radio device belongs to the base station or another radio device, transmitting a link information signal indicating the identifier of the radio device that is the source of the detection response signal to the base station or the radio device to which the device belongs; and a section for, when the radio device receives the link information signal, forwarding the link information signal to the base station or the radio device to which the device belongs.

In accordance with the third aspect of the present invention, each of the radio devices may transmit the detection response signals only when the reception strength or intensity of the detection signal is equal to or more than a prescribed threshold.

Further, in accordance with the third aspect of the present invention, the radio device which does not belong to the base station or any other radio device may belong to the radio device that is the source of the detection response signal only when the reception strength or intensity of the detection response signal is equal to or more than a prescribed threshold.

In accordance with the fourth aspect of the present invention, there is provided a sensor network system comprising a base station and a plurality of sensor terminals each having a sensor that outputs sensing data, wherein the base station includes: a section for transmitting detection signals to at least part of the sensor terminals; and a section for, when receiving a detection response signal from a sensor terminal, recognizing the sensor terminal as a sensor terminal belonging to the station based on the identifier of the sensor terminal included in the detection response signal; and wherein each of the sensor terminals includes: a section for transmitting detection response signals each including an identifier that uniquely identifies the terminal and doubling as a response signal and a detection signal for another sensor terminal in response to the detection signal received from the base station; a section for, when the sensor terminal receives the detection response signal from another sensor terminal, belonging to the sensor terminal that is the source of the detection response signal in the case where the terminal does not belong to the base station or any other sensor terminal, while in the case where the sensor terminal belongs to the base station or another sensor terminal, transmitting a link information signal indicating the identifier of the sensor terminal that is the source of the detection response signal to the base station or the sensor terminal to which the terminal belongs; and a section for, when the sensor terminal receives the link information signal, forwarding the link information signal to the base station or the sensor terminal to which the terminal belongs.

In accordance with the fourth aspect of the present invention, each of the sensor terminals may transmit the detection response signals only when the reception strength or intensity of the detection signal is equal to or more than a prescribed threshold.

Further, in accordance with the fourth aspect of the present invention, the sensor terminal which does not belong to the base station or any other sensor terminal may belong to the sensor terminal that is the source of the detection response signal only when the reception strength or intensity of the detection response signal is equal to or more than a prescribed threshold.

BRIEF DESCRIPTION OF THE DRAWINGS

The objects and features of the present invention will become more apparent from the consideration of the following detailed description taken in conjunction with the accompanying drawings in which:

FIG. 4 is a diagram showing examples of routing tables provided to a base station and sensor terminals.

DESCRIPTION OF THE PREFERRED EMBODIMENT

In the following, the principles of the present invention will be described. The present invention is concerned with a method for establishing data transmission paths in a radio communication network and a radio communication network in which data transmission paths are established according to the method. The method is characterized by ensuring stable radio communication with less traffic and enabling a data transmission path to be established by lower amounts of power.

Figure 1:
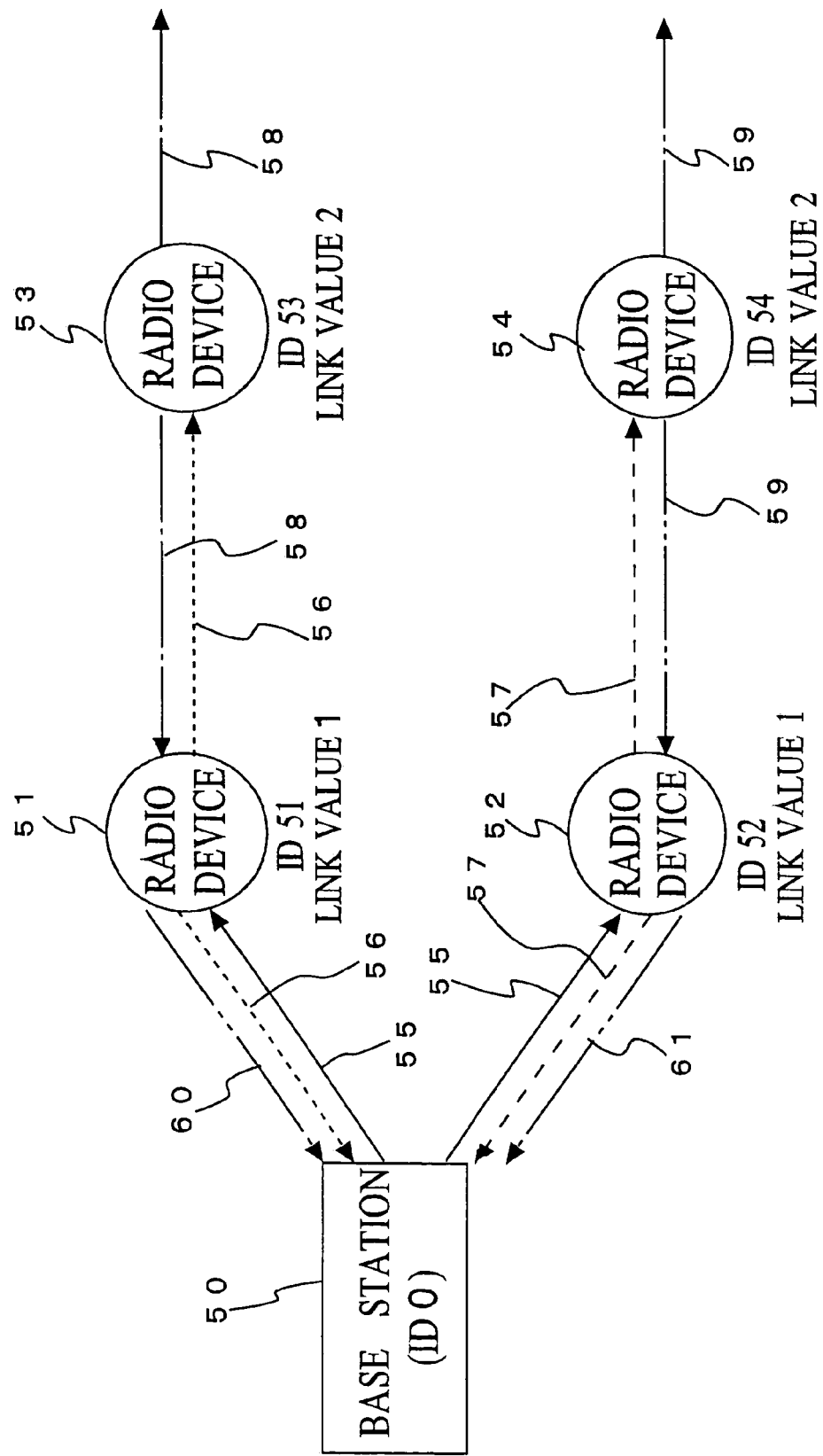
FIG. 1 is a diagram showing the principles of the present invention.

FIG. 1 is a diagram showing the principles of the present invention. Referring to FIG. 1, a radio communication network comprises a base station 50 and a plurality of radio devices 51 to 54. In the radio communication network, when the radio devices 51 and 52 each receive a detection signal 55 transmitted from the base station 50 with radio field strength or intensity exceeding a threshold level Pth, the devices 51 and 52 transmit detection response signals 56 and 57, respectively. Thus, a data transmission path is set between the base station 50 and the respective radio devices 51 and 52. On this occasion, the base station 50 obtains ID 51 and ID 52 of the radio devices 51 and 52, to which the station 50 has established the data transmission paths. The ID 51 and ID 52 uniquely identify the radio devices 51 and 52, respectively.

Besides, each of the detection response signals 56 and 57 also has a function to detect another radio device. In the radio communication network shown in FIG. 1, the radio device 53, which has received the detection response signal 56, sends back a detection response signal 58 to the radio device 51, thus establishing a data transmission path between the devices 51 and 53. In like fashion, the radio device 54, which has received the detection response signal 57, sends back a detection response signal 59 to the radio device 52, thus setting a data transmission path between the devices 52 and 54.

Having established the data transmission paths to the radio devices 53 and 54, the radio devices 51 and 52 transmit link information signals 60 and 61, respectively, to the base station 50. The link information signal 60 informs the base station 50 that the data transmission path has been established between the radio devices 51 and 53, while the link information signal 61 informs the station 50 that the data transmission path has been set between the radio devices 52 and 54. The link information signals 60 and 61 include ID 53 and ID 54 that uniquely identify the radio devices 53 and 54, respectively. Accordingly, the base station 50 can obtain the IDs of all the radio devices which have established the data transmission path.

By a series of processes as described above, the base station 50 can establish data transmission paths to all radio devices regardless of the number of the radio devices. Consequently, the base station 50 can collects data from all the radio devices.

In addition, data transmission paths are structured sequentially as a tree, starting from radio devices in the vicinity of the base station 50. Thereby, it is ensured that network traffic can be reduced, and the base station and radio devices can establish data transmission paths while consuming lower amounts of power. Further, each radio device sets a data transmission path to another radio device or the base station which has transmitted a detection response signal or a detection signal thereto only when the received field strength of the signal exceeds a prescribed field strength threshold level Pth. As a result, it is possible to assure radio communication that is stable in radio field strength or intensity.

Figure 2:
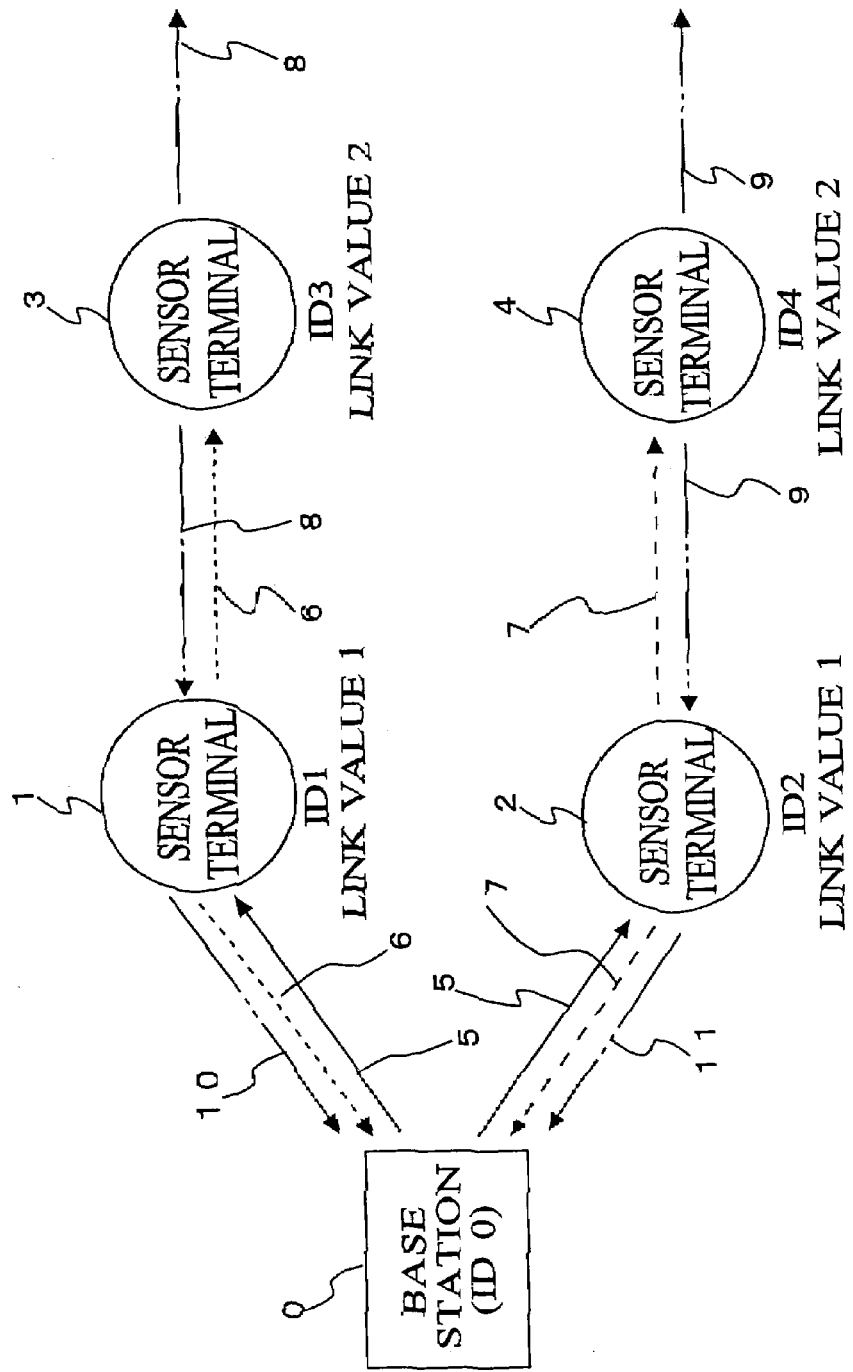
FIG. 2 is a diagram showing an example of the construction of a sensor network according to an embodiment of the present invention.

FIG. 2 is a diagram showing an example of the construction of a sensor network. The sensor network comprises a base station 0 and a plurality of sensor terminals 1 to 4. As shown in FIG. 2, by adopting sensor terminals each having a function for detecting sensing data as the radio devices in the aforementioned radio communication network of FIG. 1, it becomes possible to create the sensor network, in which the base station 0 can collect sensing data from all the sensor terminals 1 to 4. In this case, any sensor can be used without limitation.

If the sensor network of the present invention is applied to the field of environmental monitoring for measuring the temperature, humidity, amount of insolation, $CO_2$ concentration, NOx concentration and the like, NOx concentration, for example, can be monitored automatically on urban roads. Besides, if the sensor network of the present invention is applied to the field of agriculture, it is possible to automatically monitor the temperature, humidity, and the like in a plastic greenhouse from a remote location. Further, when cameras are used as the sensor terminals in the sensor network, the base station collects image data taken with the cameras, and the data collected by the base station is sent to a server installed in a security company. In this way, the sensor network of the present invention is applicable to the disaster-prevention and crime-prevention or security-related field. Incidentally, in the case where the sensor network is applied to the security-related field, the entrances and exits of buildings may be subjects for the cameras. In the case where the sensor network is applied to the disaster-related field, rivers may be subjects for the cameras so that the water levels of the rivers are monitored. Still further, when devices that output readings on gas, water, and electricity meters are used as the sensor terminals, information about readings on such meters can be obtained automatically in the base station at a remote location. Still further, when position sensors, are used as the sensor terminals, the location where a person or an object exists can be specified by outfitting the person with the sensor or attaching the sensor to the object.

While the ID is used as an identifier that uniquely identifies each radio device or sensor terminal, it is given only as an example and without limitation. The IP address, MAC address and the like of each radio device or sensor terminal can be employed as the identifier.

Referring now to the drawings, a description of a preferred embodiment of the present invention will be given in detail.

Figure 3:
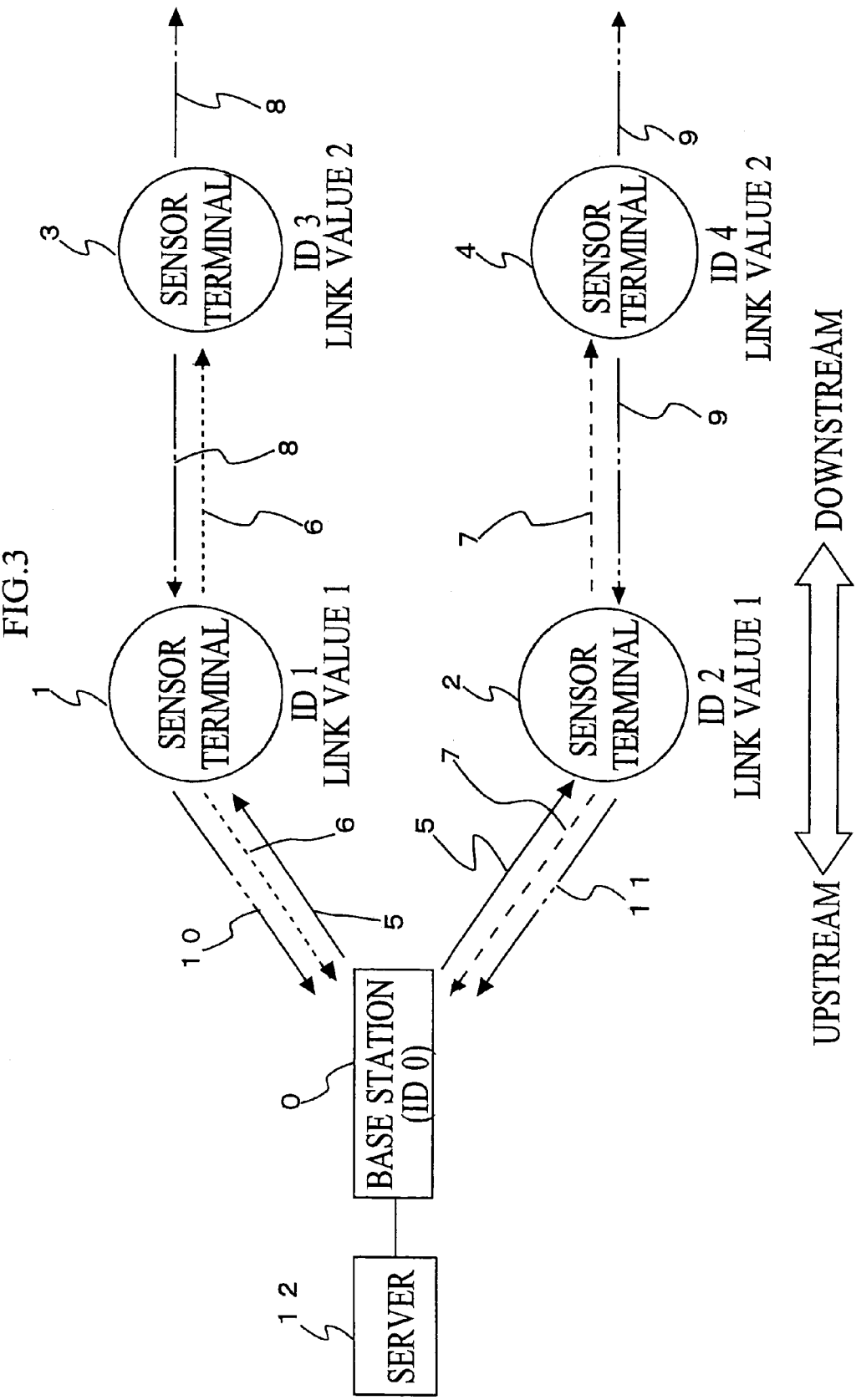
FIG. 3 is a diagram showing the flow of information on the occasion of establishing a sensing data transmission path in the sensor network depicted in FIG. 2.

FIG. 3 is a diagram showing the construction of the sensor network according to an embodiment of the present invention. Referring to FIG. 3, the sensor network comprises a base station 0, a plurality of sensor terminals 1 to 4 and a server 12.

The base station 0 is a device for transmitting a control signal to start establishing a path, and collecting sensing data from all the sensor terminals 1 to 4.

Each of the sensor terminals 1 to 4 is provided with a built-in sensor or an external sensor connectable thereto. Examples of the subjects of detection by the built-in sensor or the external sensor connected to the sensor terminal include, but are not limited to, the temperature, humidity, amount of insolation, $CO_2$ concentration, NOx concentration, and location (distance traveled).

An identification number (ID) is assigned to each of the base station 0 and the sensor terminals 1 to 4 so that a correspondent terminal (a terminal which the base station or each terminal is in communicating with) can be identified at the time of communication. Incidentally, while four sensor terminals are shown in FIG. 3, the number of the terminals is given merely by way of example and without limitation.

The server 12 indicates the base station 0 to start establishing paths between the station 0 and the sensor terminals 1 to 4, and to collect sensing data from the terminals 1 to 4. The server 12 also gives each of the sensor terminals 1 to 4 instructions as to the start of monitoring or surveillance by the built-in sensor or the external sensor connected to the terminal. In addition, the server 12 delivers the sensing data that has been collected by the base station 0 from the sensor terminals 1 to 4 to a computer terminal or the like at a remote location via the Internet (not shown). The server 12 communicates with the base station 0 via a wireless or fixed line.

The base station 0 transmits detection signals 5 to detect sensor terminals to which the station 0 is to establish paths. The sensor terminals 1 to 4 transmit detection response signals 6 to 9, respectively, in response to the detection signal 5 or the detection response signal received from another terminal. Additionally, the detection response signal (6 to 9) has a function for detecting a sensor terminal to which the sensor terminal (1 to 4) is to set a path. In other words, the detection response signal doubles as a response signal and a detection signal. The sensor terminals 1 and 2 transmit link information signals 10 and 11, respectively. The link information signal (10 and 11) informs the base station 0 that a path has been established between the sensor terminal (1 and 2) and the sensor terminal (3 and 4) to which the station 0 has not established a direct path. The link information signals 10 and 11 include ID 3 and ID 4 that uniquely identify the sensor terminals 3 and 4, respectively.

A link value of each sensor terminal indicates the number of hops from the base station 0 to the terminal. In FIG. 3, the link value of the sensor terminals 1 and 2, each having set a direct path to the base station 0 (i.e. 1 hop), is "1". On the other hand, the link value of the sensor terminals 3 and 1, each having set a path to the base station 0 via another terminal (i.e. 2 hop), is "2".

In the following, a description will be given of the operation of the sensor network according to the embodiment of the present invention.

At the start of the setting of sensing data transmission paths, the server 12 instructs the base station 0 to start establishing paths. Having received the instructions, the base station 0 transmits the detection signals 5 to detect sensor terminals to which the station 0 is to establish paths.

The sensor terminal which has received the detection signal 5 sends back a detection response signal to the base station 0 when the received field strength of the detection signals 5 exceeds a prescribed threshold value Pth.

FIG. 4 is a diagram showing examples of routing tables provided to the base station 0 and the sensor terminals 1 to 4. In FIG. 4, it is assumed that the sensor terminals 1 and 2 each receive the detection signal 5 of radio field strength or intensity exceeding the threshold value Pth.

In this case, as can be seen in FIG. 4, the sensor terminal 1 writes "ID 0" in the upstream terminal ID column of its routing table. The link value is set to "1". Similarly, the sensor terminal 2 writes "ID 0" in the upstream terminal ID column of its routing table, and sets the link value to "1".

Thereafter, the sensor terminals 1 and 2 transmit the detection response signals 6 and 7, each including its own ID (ID 1 and ID 2), to the base station 0, respectively.

On receipt of the detection response signals 6 and 7, the base station 0 writes "ID 1" and "ID 2" in the downstream terminal ID column of its routing table as shown in FIG. 4. In this way, paths are established between the base station 0 and the respective sensor terminals 1 and 2.

Each of the detection response signals 6 and 8 also has a function for detecting a downstream sensor terminal to which each of the sensor terminals 1 and 2 is to set a path. In FIG. 4, it is assumed that the sensor terminals 3 and 4 receive the detection response signals 6 and 7, respectively, with radio field strength or intensity exceeding the threshold value Pth.

At this point, each of the sensor terminals 3 and 4 has not established a path to any base station or sensor terminals. In other words, the upstream terminal ID columns of their routing tables are blank. Therefore, as can be seen in FIG. 4, the sensor terminal 3 writes "ID 1" in the upstream terminal ID column of its routing table, and sets the link value to "2". Similarly, the sensor terminal 4 writes "ID 2" in the upstream terminal ID column of its routing table, and sets the link value to "2".

After that, the sensor terminals 3 and 4 transmit the detection response signals 8 and 9, each including its own ID (ID 3 and ID 4), to the sensor terminals 1 and 2, respectively.

At this stage, the downstream terminal ID column in the routing table of the sensor terminal 1 is blank. Accordingly, when receiving the detection response signal 8, the sensor terminal 1 writes "ID 3" in the downstream terminal ID column of its routing table as can be seen in FIG. 4. In addition, the sensor terminal 1 transmits the link information signal 10 including the ID 3 to the base station 0 so as to inform the station 0 that a path has been set between the terminals 1 and 3.

In the same manner as the sensor terminal 1, when receiving the detection response signal 9, the sensor terminal 2 writes "ID 4" in the downstream terminal ID column of its routing table. Then, the sensor terminal 2 transmits the link information signal 11 including the ID 4 to the base station 0 so as to inform the station 0 that a path has been set between the terminals 2 and 4.

As described above, in the case where a sensor terminal having a routing table, in which the upstream terminal ID column is blank, receives a detection response signal from another sensor terminal or a detection signal from a base station, the terminal recognizes the terminal or the station that has send the signal thereto as an upstream or upper node. On the other hand, in the case where a sensor terminal that has already established a path to another sensor terminal or a base station (i.e. a sensor terminal having a routing table, in which an ID is written in the upstream terminal ID column) receives a detection response signal from another sensor terminal, the terminal writes the ID of the terminal that has send the signal thereto in the downstream terminal ID column of its routing table so that the downstream terminal belongs to the terminal.

The base station 0 can obtain the IDs of all the sensor terminals which have established the data transmission path from the link information signals 10 and 11.

As just described, the base station 0 can obtain the IDs of all sensor terminals, which have established a path, based on the link information signals received from the terminals. This means that, if the IDs of respective sensor terminals are registered with the server 12 in advance and the base station 0 sends the server 12 IDs obtained from sensor terminals which have established a path, the server 12 can be made aware whether all the terminals have finished setting paths.

In FIG. 3, having received the IDs 1 to 4 of the sensor terminals 1 to 4, the server 12 recognizes that all the terminals 1 to 4 have finished setting paths.

With reference to the ID written in the upstream terminal ID column of the routing table, each sensor terminal transmits sensing data to the upstream sensor terminal to which the terminal belongs. Meanwhile, when receiving sensing data from a downstream terminal, each sensor terminal forwards the data to the upstream sensor terminal to which the terminal belongs. In the case where the sensor terminal, which receives the sensing data, directly belongs to a base station, the terminal forwards the data to the base station. As a result, sensing data detected by all sensor terminals are collected at the base station.

According to the embodiment of the present invention, data transmission paths are structured in sequence as a tree, starting from a terminal (in FIG. 3, the base station 0) where sensing data detected by all sensor terminals are collected. Besides, as can be seen in FIG. 3, the detection response signal transmitted from each sensor terminal combines a response function with a detection function. Thereby, network traffic can be reduced. Thus, the base station and sensor terminals can establish data transmission paths efficiently while consuming lower amounts of power.

Figure 5:
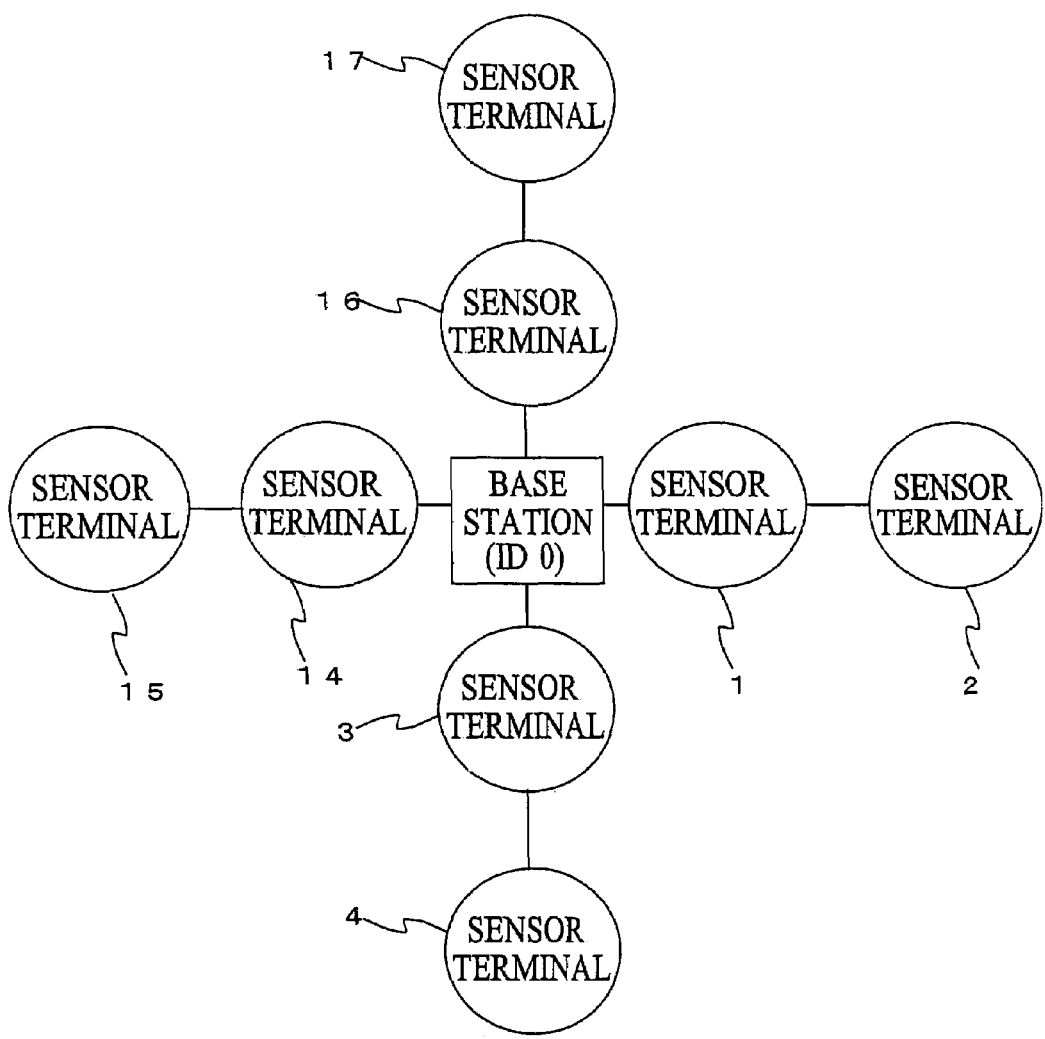
FIG. 5 is a diagram showing an example of the construction of a sensor network according to an embodiment of the present invention.

Incidentally, a description has been given of the case where two radio devices or sensor terminals directly belong to a base station. However, as shown in FIG. 5, there may be three or more radio devices or sensor terminals that directly belong to a base station. In this case, each radio device or sensor terminal operates in the same manner as described previously. Thereby, all the radio devices or sensor terminals can establish a data transmission path to the base station.

As set forth hereinabove, in accordance with the present invention, it becomes possible to create a network where respective small devices, which are required to consume lower amounts of power, such as sensors establish data transmission paths to a base station independently.

Moreover, it is possible to reduce the number of operations for transmitting and receiving radio signals, which require a measurable amount of power. Since radio signals are not transmitted and received needlessly, it is also possible to create a radio communication network, which allows electric power consumption to be reduced. Besides, each radio device sets a data transmission path to another radio device or a base station which has transmitted a signal thereto only when the received field strength of the signal exceeds a prescribed field strength threshold level. As a result, it is possible to assure radio communication that is stable in radio field strength or intensity.

Furthermore, the data transmission path establishing method of the present invention is applicable to any type of sensor terminals. Therefore, in the case where sensor terminals are disposed all over the target area, data transmission paths are automatically established between the respective terminals to form a sensor network. Thus, sensing data detected by all the sensor terminals disposed in the target area can be automatically collected at a base station or one terminal.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A data transmission path establishing method, wherein:
a base station transmits detection signals to a plurality of radio devices;
each of the radio devices which have received the detection signal transmits detection response signals each including an identifier that uniquely identifies the device and doubling as a response signal and a detection signal for another radio device;
the base station which have received the detection response signal from a radio device recognizes the radio device as a radio device belonging to the station based on the identifier included in the detection response signal;
a radio device which have received the detection response signal from another radio device belongs to the radio device that is the source of the detection response signal when the device does not belong to the base station or any other radio device, while when the radio device belongs to the base station or another radio device, the device transmits a link information signal indicating the identifier of the radio device that is the source of the detection response signal to the base station or the radio device to which the device belongs; and
the radio device which have received the link information signal forwards the link information signal to the base station or a radio device to which the device belongs.

2. The data transmission path establishing method claimed in claim 1, wherein the radio devices which have received the detection signal transmits the detection response signals only when the reception strength of the detection signal is equal to or more than a prescribed threshold.

3. The data transmission path establishing method claimed in claim 2, wherein the radio device which does not belong to the base station or any other radio device belongs to the radio device that is the source of the detection response signal only when the reception strength of the detection response signal is equal to or more than a prescribed threshold.

4. The data transmission path establishing method claimed in claim 1, wherein the radio device which does not belong to the base station or any other radio device belongs to the radio device that is the source of the detection response signal only when the reception strength of the detection response signal is equal to or more than a prescribed threshold.

5. A data transmission path establishing method, wherein:
a base station transmits detection signals to a plurality of sensor terminals each having a sensor that outputs sensing data;
each of the sensor terminals which have received the detection signal transmits detection response signals each including an identifier that uniquely identifies the terminal and doubling as a response signal and a detection signal for another sensor terminal;

the base station which have received the detection response signal from a sensor terminal recognizes the sensor terminal as a sensor terminal belonging to the station based on the identifier included in the detection response signal;

a sensor terminal which have received the detection response signal from another sensor terminal belongs to the sensor terminal that is the source of the detection response signal when the terminal does not belong to the base station or any other sensor terminal, while when the sensor terminal belongs to the base station or another sensor terminal, the terminal transmits a link information signal indicating the identifier of the sensor terminal that is the source of the detection response signal to the base station or the sensor terminal to which the terminal belongs; and the sensor terminal which have received the link information signal forwards the link information signal to the base station or a sensor terminal to which the terminal belongs.

6. The data transmission path establishing method claimed in claim 5, wherein the sensor terminals which have received the detection signal transmits the detection response signals only when the reception strength of the detection signal is equal to or more than a prescribed threshold.

7. The data transmission path establishing method claimed in claim 6, wherein the sensor terminal which does not belong to the base station or any other sensor terminal belongs to the sensor terminal that is the source of the detection response signal only when the reception strength of the detection response signal is equal to or more than a prescribed threshold.

8. The data transmission path establishing method claimed in claim 5, wherein the sensor terminal which does not belong to the base station or any other sensor terminal belongs to the sensor terminal that is the source of the detection response signal only when the reception strength of the detection response signal is equal to or more than a prescribed threshold.

9. A radio communication network system comprising a base station and a plurality of radio devices:

wherein the base station includes:
  a section for transmitting detection signals to at least part of the radio devices; and
  a section for, when receiving a detection response signal from a radio device, recognizing the radio device as a radio device belonging to the station based on the identifier of the radio device included in the detection response signal; and wherein each of the radio devices includes:
  a section for transmitting detection response signals each including an identifier that uniquely identifies the device and doubling as a response signal and a detection signal for another radio device in response to the detection signal received from the base station;
  a section for, when the radio device receives the detection response signal from another radio device, belonging to the radio device that is the source of the detection response signal in the case where the device does not belong to the base station or any other radio device, while in the case where the radio device belongs to the base station or another radio device, transmitting a link information signal indicating the identifier of the radio device that is the source of the detection response signal to the base station or the radio device to which the device belongs; and
  a section for, when the radio device receives the link information signal, forwarding the link information signal to the base station or the radio device to which the device belongs.

10. The radio communication network system claimed in claim 9, wherein each of the radio devices transmits the detection response signals only when the reception strength of the detection signal is equal to or more than a prescribed threshold.

11. The radio communication network system claimed in claim 10, wherein the radio device which does not belong to the base station or any other radio device belongs to the radio device that is the source of the detection response signal only when the reception strength of the detection response signal is equal to or more than a prescribed threshold.

12. The radio communication network system claimed in claim 9, wherein the radio device which does not belong to the base station or any other radio device belongs to the radio device that is the source of the detection response signal only when the reception strength of the detection response signal is equal to or more than a prescribed threshold.

13. A sensor network system comprising a base station and a plurality of sensor terminals each having a sensor that outputs sensing data:

wherein the base station includes:
  a section for transmitting detection signals to at least part of the sensor terminals; and
  a section for, when receiving a detection response signal from a sensor terminal, recognizing the sensor terminal as a sensor terminal belonging to the station based on the identifier of the sensor terminal included in the detection response signal; and wherein each of the sensor terminals includes:
  a section for transmitting detection response signals each including an identifier that uniquely identifies the terminal and doubling as a response signal and a detection signal for another sensor terminal in response to the detection signal received from the base station;
  a section for, when the sensor terminal receives the detection response signal from another sensor terminal, belonging to the sensor terminal that is the source of the detection response signal in the case where the terminal does not belong to the base station or any other sensor terminal, while in the case where the sensor terminal belongs to the base station or another sensor terminal, transmitting a link information signal indicating the identifier of the sensor terminal that is the source of the detection response signal to the base station or the sensor terminal to which the terminal belongs; and
  a section for, when the sensor terminal receives the link information signal, forwarding the link information signal to the base station or the sensor terminal to which the terminal belongs.

14. The sensor network system claimed in claim 13, wherein each of the sensor terminals transmits the detection response signals only when the reception strength of the detection signal is equal to or more than a prescribed threshold.

15. The sensor network system claimed in claim 14, wherein the sensor terminal which does not belong to the base station or any other sensor terminal belongs to the sensor terminal that is the source of the detection response signal only when the reception strength of the detection response signal is equal to or more than a prescribed threshold.

16. The sensor network system claimed in claim 13, wherein the sensor terminal which does not belong to the base station or any other sensor terminal belongs to the sensor terminal that is the source of the detection response signal only when the reception strength of the detection response signal is equal to or more than a prescribed threshold.

* * * * *